R. M. BERNARD.
ANIMAL TRAP.
APPLICATION FILED MAR. 20, 1917.
1,234,120.
Patented July 24, 1917.
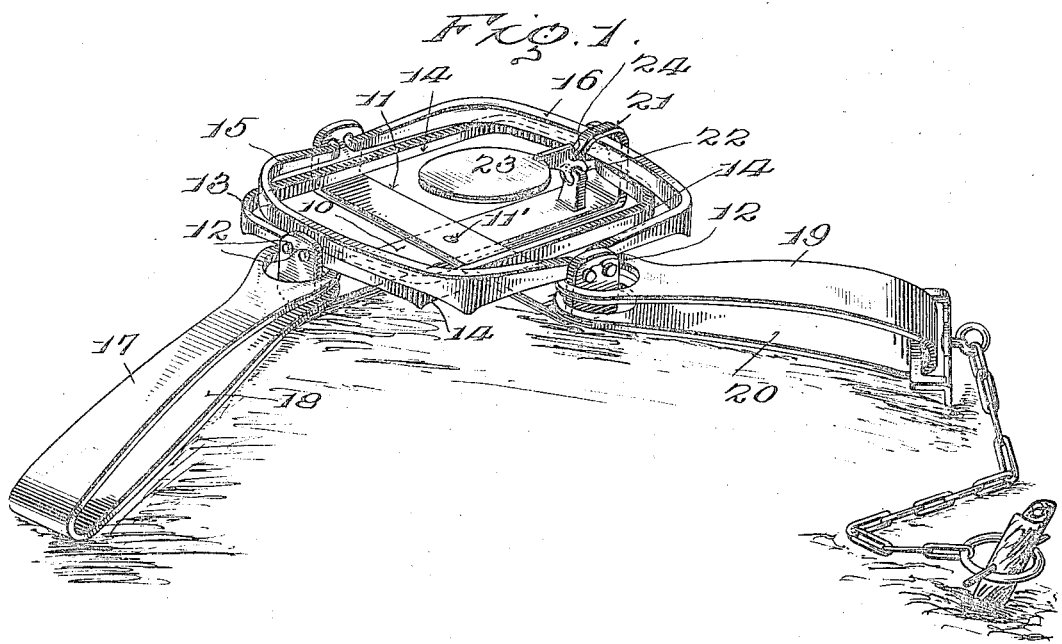
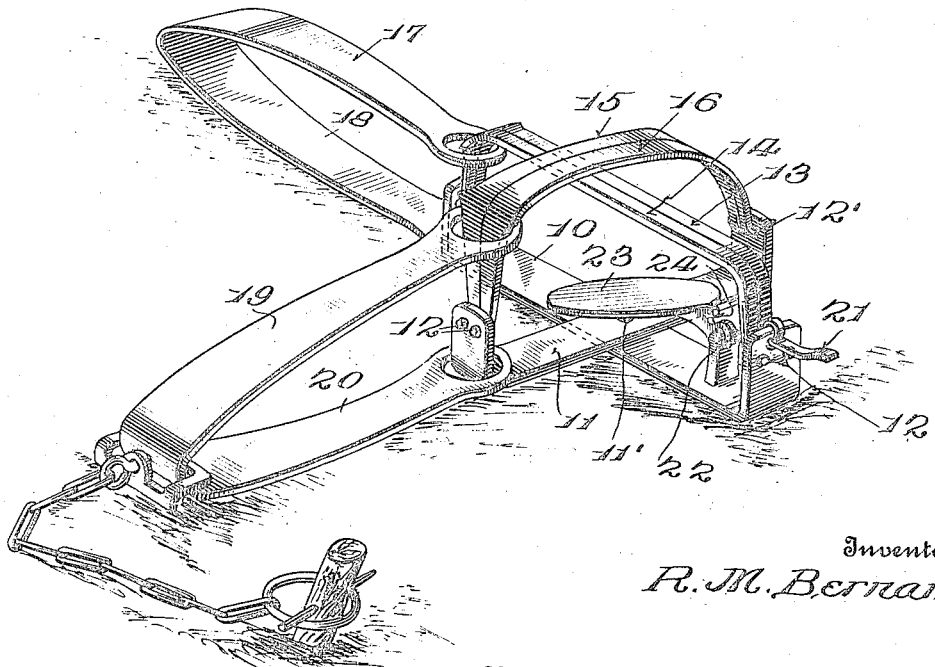
Inventor
R. M. Bernard
By
Attorneys

UNITED STATES PATENT OFFICE.

ROSCOE M. BERNARD, OF SUMMERFIELD, KANSAS.

ANIMAL-TRAP.

1,234,120.

Specification of Letters Patent.   Patented July 24, 1917.

Application filed March 20, 1917.   Serial No. 156,143.

*To all whom it may concern:*

Be it known that I, ROSCOE M. BERNARD, a citizen of the United States, residing at Summerfield, in the county of Marshall and State of Kansas, have invented certain new and useful Improvements in Animal-Traps, of which the following is a specification.

This invention relates to improvements in animal traps, and has for one of its objects to provide a trap so arranged that the leg or other portion of the animal caught by the trap will be held from all sides equally, and at the strongest portion of the trap, so that the animal cannot escape by forcing the leg or other portion caught in the trap toward the weaker portion of the holding means.

Another object of the invention is to produce a trap having oppositely operating and coacting gripping members, and so arranged that one of the gripping members holds the other gripping member from movement so that a single trigger holds both of the gripping members in open or set position.

With these and other objects in view, the invention consists in certain novel features of construction, as hereinafter shown and described and then specifically pointed out in the claims; and in the drawings illustrative of the preferred embodiment of the invention—

Figure 1 is a perspective view of the improved trap with the parts in open or "set" position.

Fig. 2 is a perspective view of the improved trap with the parts in closed position.

Corresponding and like parts are referred to in the following description and indicated in all the views of the drawings by the same reference characters.

The trap in its approved form comprises a base consisting of members 10—11 crossing each other at right angles and united by a rivet or other fastening device 11'. At their terminals the members 10—11 are turned upwardly and each upturned portion provided with bearing apertures 12 disposed in spaced relation. Mounted to swing in the bearings 12 of the member 10 are coacting jaws 13—14, and mounted to swing in the bearings of the member 11 are coacting jaws 15—16, the jaws being each provided with out-turned terminals swingingly engaged in the apertures 12. The jaws 13—14 when in closed position engage by their confronting edges, while the jaws 15—16 likewise engage by their confronting edges when in their closed position, as shown in Fig. 2, one set of the jaws, for instance the jaws 13—14 being disposed within the jaws 15—16 when closed, as shown in Fig. 2. By this means the central points of all the jaws when closed are in vertical alinement. Springs 17—18 are arranged to actuate the jaws 13—14, while similar springs 19—20 are arranged to actuate the jaws 15—16. For the purpose of this description the jaws 13—14 are referred to as the inner jaws and the jaws 15—16 are referred to as the outer jaws.

The outer jaws it will be noted by reference to Fig. 1 bear upon the inner jaws when open, and thus hold the inner jaws in open position against the reactionary force of their operating springs. Mounted to swing upon the base member 10 with which the inner jaws are associated is a trigger device 21, and pivotally connected at 22 to the same member 10 is a combined bait pan and trip device 23. The member 23 is provided with a notch 24 in which the trigger member 21 engages when the trap is "set."

By arranging the outer jaw devices to engage the inner jaw devices and hold them closed, one trigger device is utilized to hold all four of the jaws in open position against the reactionary force of the springs. In setting the trap the jaws are forcibly disposed in their open position and the trigger device 21 passed over the adjacent jaw 16 and engaged in the notch 24 of the trip device. By this means the springs are held in their downward or closed position, and then when an animal actuates the trip devices in the effort to remove the bait, or steps upon the member 23, the springs are released and the two sets of jaws moved into closed position, the portion of the animal which is disposed within the paths of the jaws being caught and held centrally of both pairs of jaws. The strongest grip of the jaws is of course centrally thereof, and by arranging the two sets of jaws to operate at right angles to each other, the animal will be caught and held between the central and strongest portions of the jaws.

In the ordinary steel trap the weakest portion of the jaw is toward the pivoted ends, and animals sometimes escape by forcing the leg or other portion caught in the trap toward the pivotal or weakest ends of the jaws, and in their struggles frequently distend the jaws to a sufficient extent to release the leg. With the improved trap, however, no such movement is possible, as the leg or other portion is held equally by both pairs of jaws, and at the strongest portions of the jaws.

Many animals when caught in traps of this character attempt to release themselves and frequently succeed by gnawing off a portion of the foot below the jaws of the trap, these portions having become benumbed by the pressure of the jaws.

With the improved trap there is always enough of the bone and flesh of the animal left between the coacting pairs of jaws which cannot be eaten away by the animal. With the ordinary trap on the contrary the portion of the leg or other part of the animal is frequently pulled toward the weaker end of the jaws and released, but in the improved construction, as before stated, the coacting jaws operating at right-angles prevent the formation of any weakened portion.

It is immaterial with the improved trap which way the animal passes over the trigger, as one pair of the jaws is sure to catch the flat side of the foot, and generally by the toes, which is not often done by the ordinary trap when set in a den or narrow place where the animal must pass over but one way.

Another advantage of the improved trap is that two pairs of the jaws operating as described are not so liable to break the leg of the animal as when the pressure is applied to but one pair of jaws.

If required another pair of the springs may be applied to the opposite side of the upper jaws, but this arrangement of springs upon the traps of this character is so well known that it is not thought necessary to illustrate the same.

The trigger member is preferably made heavier than the ordinary trigger to prevent its tendency to rebound and be caught between the quickly closing jaws.

The improved device is simple in construction, can be inexpensively manufactured, and effectually grips and holds any animal which may be engaged thereby.

The improved trap can be constructed of any required size and of any required strength to adapt it to different sizes or species of animals.

Having thus described the invention, what is claimed as new is—

1. In an animal trap, a base having a plurality of bearings arranged in sets, lower jaws mounted to swing in one set of said bearings, upper jaws mounted to swing in another set of said bearings, and springs arranged to urge said jaws into closed position, said outer jaws adapted to hold said inner jaws in open position against the reaction of said springs, and a trigger device engaging said outer jaws.

2. In an animal trap, coacting jaw devices mounted to swing at right angles to each other, springs arranged to urge said jaw devices into closed position, one of said jaw devices adapted to hold the other jaw device in open position against the resistance of said springs, and a trigger device engaging said holding jaw device.

3. An animal trap comprising coacting outer jaws, coacting inner jaws operating within the paths of the outer jaws and substantially at right angles thereto, a spring device urging the inner jaws into closed position, a spring device urging the outer jaws into closed position and transversely of the inner jaws, said outer jaws adapted to bear upon the inner jaws and hold them in open position, and a trigger device adapted to hold the outer jaws in open position against the reaction of the spring device.

In testimony whereof I affix my signature.

ROSCOE M. BERNARD. [L. S.]